United States Patent
Oikawa

(10) Patent No.: US 10,817,232 B2
(45) Date of Patent: Oct. 27, 2020

(54) IMAGE FORMING DEVICE THAT MANAGES EXECUTION PERMISSION WITHOUT INCREASING ADMINISTRATIVE WORKLOAD REQUIRED FOR REMOTE OPERATION

(71) Applicant: Konica Minolta, Inc., Tokyo (JP)

(72) Inventor: Takashi Oikawa, Toyohashi (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/548,308

(22) Filed: Aug. 22, 2019

(65) Prior Publication Data

US 2020/0073604 A1 Mar. 5, 2020

(30) Foreign Application Priority Data

Aug. 29, 2018 (JP) .................................. 2018-160112

(51) Int. Cl.
| | |
|---|---|
| *G06F 15/00* | (2006.01) |
| *G06F 1/00* | (2006.01) |
| *G06K 15/00* | (2006.01) |
| *G06F 3/12* | (2006.01) |

(52) U.S. Cl.
CPC .......... *G06F 3/1238* (2013.01); *G06F 3/1229* (2013.01); *G06F 3/1255* (2013.01); *G06F 3/1292* (2013.01)

(58) Field of Classification Search
CPC .... G06F 3/1204; G06F 3/1208; G06F 3/1243; H04L 67/10
USPC ................................ 358/1.1, 1.2, 1.13, 1.14
See application file for complete search history.

(56) References Cited

U.S. PATENT DOCUMENTS

| | | | |
|---|---|---|---|
| 2015/0186669 A1* | 7/2015 | Nicolaou | G06F 21/6218 726/4 |
| 2018/0375891 A1* | 12/2018 | Juncker | H04L 63/101 |

FOREIGN PATENT DOCUMENTS

| | | |
|---|---|---|
| JP | 2013183215 A | 9/2013 |
| JP | 2017188796 A | 10/2017 |

\* cited by examiner

*Primary Examiner* — Douglas Q Tran
(74) *Attorney, Agent, or Firm* — Osha Liang LLP

(57) ABSTRACT

An image forming device includes: a central processing unit (CPU); and a storage connected to the CPU and that stores permission levels required for execution of user instructions in a first table for an internal web user interface (UI) application and in a second table for an external web UI application installed on an external device. The CPU: acquires a user level; determines whether a web UI application is installed on the image forming device or the external device; acquires a permission level, from the first table when the user instruction is received from the image forming device and from the second table when the user instruction is received from the external device; and allows execution of the user instruction when the user level is equal to or higher than the acquired permission level acquired.

19 Claims, 15 Drawing Sheets

FIG. 4A  Request source information table

| Request source ID | Secret code | Trust level |
|---|---|---|
| App_001 | XXXXXXXX | Low |
| App_002 | YYYYYYYY | Low |
| App_003 | ZZZZZZZZ | High |
| ⋮ | ⋮ | ⋮ |

FIG. 4B  User information table

| User ID | Execution authority |
|---|---|
| U_001 | General |
| U_002 | General |
| U_003 | Administrator |
| ⋮ | ⋮ |

FIG. 4C  Required permission table

| Processing content | First table | Second table |
|---|---|---|
| Prioritized sheet feed tray setting | General | Administrator |
| Auto color level setting | General | Administrator |
| Output image direction setting | General | Administrator |
| Job execution setting with inappropriate setting | General | Administrator |
| Power-saving setting | General | Administrator |
| Network setting | Administrator | Administrator |
| Main body authentication setting | Administrator | Administrator |
| ⋮ | ⋮ | ⋮ |

Request source information table

| Request source ID | Secret code | Trust level | Default authority |
|---|---|---|---|
| App_001 | XXXXXXX | Low | General |
| App_002 | YYYYYYY | Low | General |
| App_003 | ZZZZZZZ | High | Administrator |

Trust relationship establishing procedure

FIG. 15
Prior Art

| Serviceperson ID<br>Processing content | S_001 | S_002 | ... | S_N | ... |
|---|---|---|---|---|---|
| Prioritized sheet feed tray setting | General | Administrator | ... | General | ... |
| Auto color level setting | General | Administrator | ... | General | ... |
| Output image direction setting | General | Administrator | ... | General | ... |
| Job execution setting with inappropriate setting | General | Administrator | ... | Administrator | ... |
| Power-saving setting | General | Administrator | ... | Administrator | ... |
| Network setting | Administrator | Administrator | ... | Administrator | ... |
| Main body authentication setting | Administrator | Administrator | ... | Administrator | ... |
| ⋮ | ⋮ | ⋮ | ⋮ | ⋮ | ⋱ |

IMAGE FORMING DEVICE THAT MANAGES EXECUTION PERMISSION WITHOUT INCREASING ADMINISTRATIVE WORKLOAD REQUIRED FOR REMOTE OPERATION

CROSS-REFERENCE TO RELATED APPLICATIONS

This application claims priority to Japanese Patent Application No. 2018-160112 filed Aug. 29, 2018, the contents of which are hereby incorporated herein by reference in their entirety.

BACKGROUND

Technical Field

The present disclosure relates to image forming devices having a web user interface (UI), and in particular a technology for reducing administrative workload and preventing an increase in security risks where remote operations of an image forming device with use of a web UI are permitted.

Description of the Related Art

Recently, many framework tools for building UIs making use of web technology have been made available, and use of such tools for operation panels of image forming devices is expected to enable UI customization at low cost in short time frames.

Recently, web UIs that are built with use of web technology are widely used as graphical user interfaces (GUIs) of operation panels for changing settings. Web UIs are advantageous in being customizable at low cost and within short time frames and in enabling multi-function peripherals (MFPs) to be used by external devices through a network, among other advantages.

MFPs provide a wide variety of functions, and therefore many settings need to be set when using an MFP. Further, there is a risk that the ability of a user to freely change MFP settings may hinder trouble-free usage of the MFP by other users, and therefore only users who have administrator authority and people who are in charge of maintenance of the MFP are typically allowed to change settings of the MFP.

Where an MFP is located in an office or the like, a limited number of users can directly operate the MFP, and therefore problems do not occur in practice even when users who have a general user level of authority are allowed, for convenience, to change settings that do not cause security risks such as power-saving, sheet feed trays to be used when printing, and image quality.

However, where web UIs cause the MFP to be operated by issuance of a request to a web application program interface (API) server, the web API can receive requests from a large number of unspecified web UIs through a network due to the characteristics of web technology. Accordingly, in order to ensure the security and trouble-free usage of the MFP, it is beneficial to restrict execution permissions of remote users.

In view of such problems, for example, it is possible to apply conventional technology to acquire user location information and allow users in proximity of the MFP to perform remote operation from tablet-type devices (for example, see JP2013-183215). That is, usage by a large number of unspecified users who are remote from the MFP is restricted by granting an administrator level of authority only to users in proximity of the MFP, thereby achieving security and trouble-free usage as described above.

However, when the conventional technology described above is applied, administrator authority is granted to anyone in proximity of the MFP, and therefore anyone in proximity of the MFP can perform operations that may cause security risks, such as editing of user information. Further, a problem may occur when the MFP cannot be used from a tablet terminal from which location information cannot be acquired.

Further, as illustrated in FIG. 15, a technology has been proposed of assigning in advance execution permissions for each combination of serviceperson and processing content in accordance with levels of expertise of service people in charge of maintenance of the MFP (for example, see JP 2017-188796), but it is difficult to apply such conventional technology to a large number of unspecified users. Further, assigning execution permissions to a wide range of users individually is a substantial administrative workload and therefore unrealistic.

SUMMARY

One or more embodiments of the present invention provide an image forming device that can appropriately manage execution permissions without increasing an administrative workload required for remote operations via a web UI.

According to one or more embodiments of the present disclosure, an image forming device reflecting one aspect of the present disclosure is an image forming device that receives a user instruction from a web user interface (UI) application via a web application program interface (API). The image forming device includes a central processing unit (CPU); and a storage storing a first table that includes permission levels required for execution of user instructions that are received from an internal web UI application installed to the image forming device, and a second table that includes permission levels required for execution of user instructions that are received from an external web UI application installed to an external device. The CPU: acquires a user level; determines whether a web UI application from which the user instruction is transmitted is installed to the image forming device or the external device; acquires a permission level required for execution of the user instruction, from the first table when the user instruction is received from the image forming device, and from the second table when the user instruction is received from the external device; and allows execution of the user instruction when the user level is equal to or higher than the permission level acquired. For each user instruction, the permission level included in the second table is equal to or higher than the permission level included in the first table.

BRIEF DESCRIPTION OF THE DRAWINGS

The advantages and features provided by one or more embodiments of the disclosure will become more fully understood from the detailed description given hereinbelow and the appended drawings which are given by way of illustration only, and thus are not intended as a definition of the limits of the invention. In the drawings:

FIG. 4A illustrates a request source information table, FIG. 4B illustrates a user identification information table, and FIG. 4C illustrates a required permission table according to one or more embodiments;

FIG. 15 is a conventional execution permission table for service people.

DETAILED DESCRIPTION

Hereinafter, one or more embodiments of the present disclosure will be described with reference to the drawings. However, the scope of the invention is not limited to the disclosed embodiments.

[1] Configuration of Image Forming System

The following describes a configuration of an image forming system pertaining to one or more embodiments of the present invention.

Figure 1:
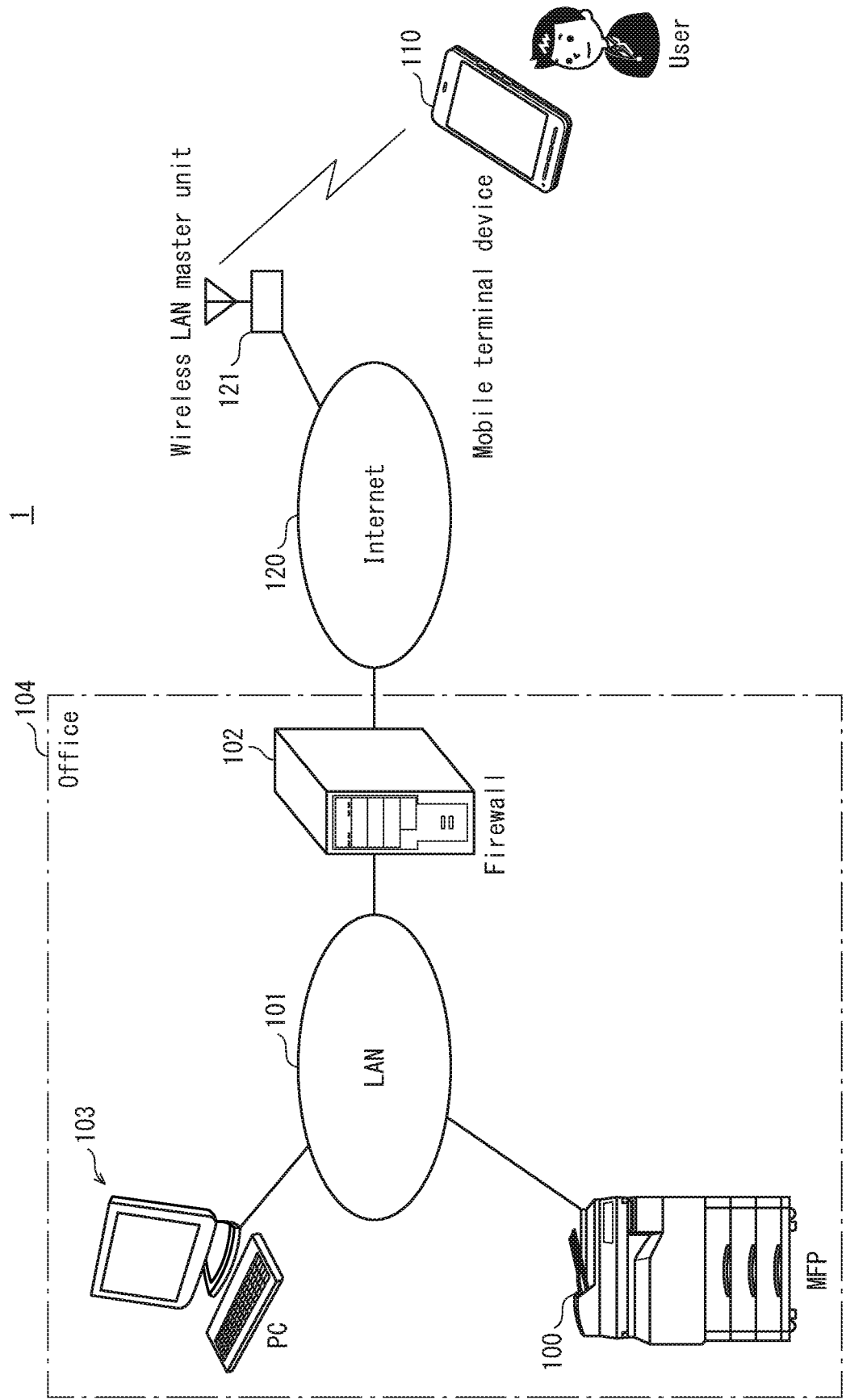
FIG. 1 illustrates main components of an image forming system pertaining to one or more embodiments of the present disclosure.

As illustrated in FIG. 1, the image forming system 1 includes a local area network (LAN) 101 that is in an office 104 and is connected through a firewall 102 to the Internet 120. A personal computer (PC) 103 and a multi-function peripheral (MFP) 100 are connected to the LAN 101. Further, a user of the image forming system 1 can use the MFP 100 through the Internet 120 by accessing a wireless LAN master unit 121 with use of a mobile terminal device 110 such as a tablet-type device or a smartphone.

The firewall 102 restricts access from the Internet 120 to the LAN 101 but allows access from the mobile terminal device 110 to the MFP 100. The MFP 100 and the PC 103 can access the Internet 120 through the firewall 102. The MFP 100 receives a job from the mobile terminal device 110 or the PC 103 and executes processing, or, as described later, the MFP 100 receives a user operation through an operation panel of the MFP 100 and executes processing.

[2] Software Configuration Related to Operation of MFP 100

Figure 2:
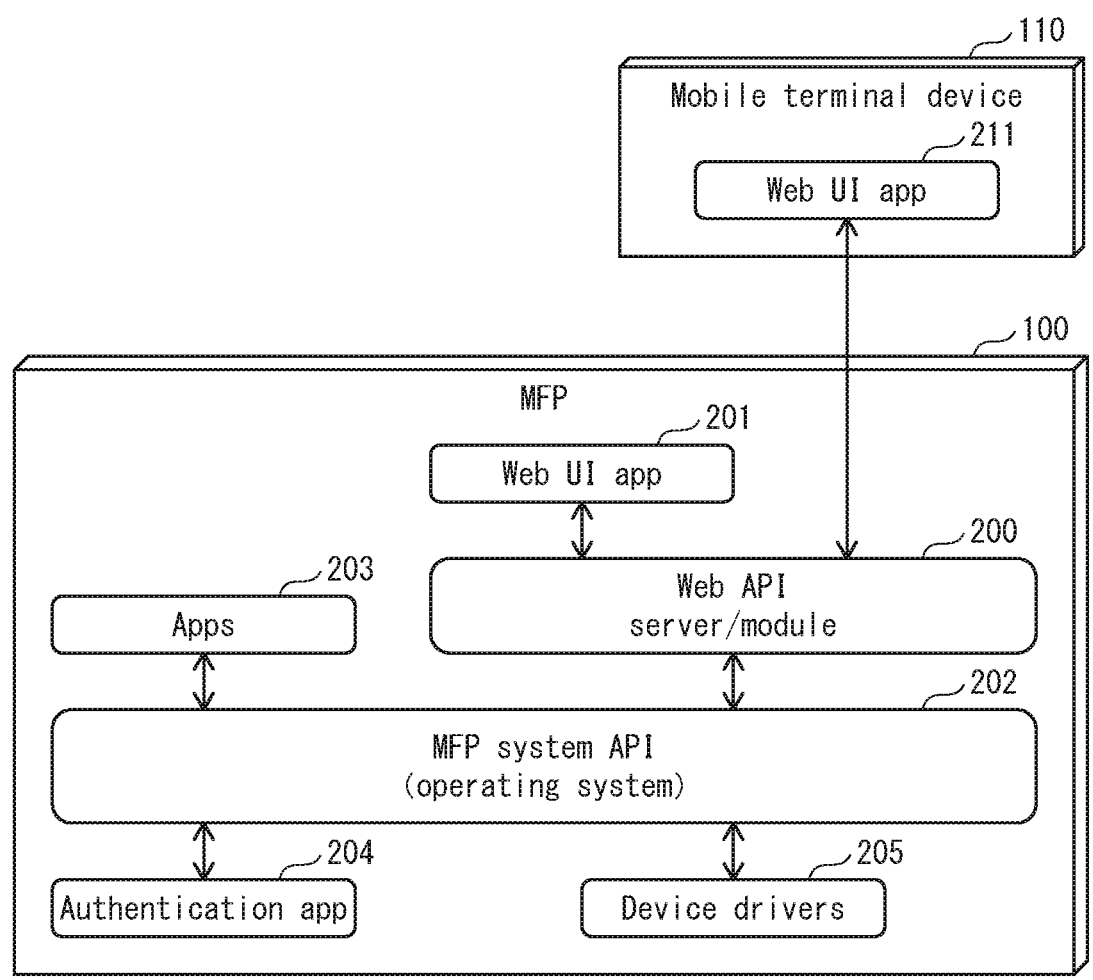
FIG. 2 illustrates main software components of the image forming system pertaining to one or more embodiments of the present disclosure.

The MFP 100 builds a GUI with use of web technology. Specifically, as illustrated in FIG. 2, a web application program interface (API) server/module (also referred to as "web API server") 200 is installed to the MFP 100, and the web API server 200 executes processing in response to a request from a web user interface program (also referred to as "web UI") 201, 211. Note that various application programs (also referred to as "apps") 203 are installed to the MFP 100 in addition to the web API server 200.

The web API server 200 and the apps 203 transmit processing requests to an MFP system API 202 with use of an API provided by the MFP system API 202. The MFP system API 202 is an interface for accessing an operating system (OS) of the MFP 100. When the web API server 200 transmits a user instruction to the MFP system API 202, processing such as driving of components of the MFP 100 by a device driver 205 or authentication processing by an authentication program 204 is executed in accordance with the content of the user instruction.

Upon receiving a request from the web UI 201, 211, the web API server 200 sends back web page data. Due to this, the web UI 201 causes the operation panel of the MFP 100 to display a GUI or the web UI 211 causes a display screen of the mobile terminal device 110 to display a GUI. Upon receiving a user operation through the GUI, the web UI 201, 211 transmits a user instruction to the web API server 200. In response to a user instruction from the web UI 201, 211, the web API server 200 requests processing with use of the MFP system API.

As described above, by providing a GUI for causing functions of the MFP 100 to be executed by using the web API server 200, the MFP 100 can be operated with use of the web UIs 201, 211, which are UI applications making use of web technology. This improves customizability of the web UIs 201, 211 and reduces customization costs. The web UI 201 is incorporated into a main body of the MFP 100 and operates as an application of the operation panel of the MFP 100. Further, the web UI 211 is incorporated into the mobile terminal device 110, and therefore the MFP 100 is operable from the mobile terminal device 110 carried by a user.

[3] Operation of MFP 100 by Using Web UI 201, 211

The following describes operation of the MFP 100 by using the web UI 201, 211.

The web API server 200 can be accessed through the Internet 120 from the mobile terminal device 110, and therefore a measure is necessary for avoiding security risks such as information leaks and unauthorized operations. In order to achieve this, one or more embodiments of the present invention determine which of the web UI 201 of the MFP 100 and the web UI 211 of the mobile terminal device 110 is used, in order to restrict execution permissions of the web UI 211.

Figure 3:
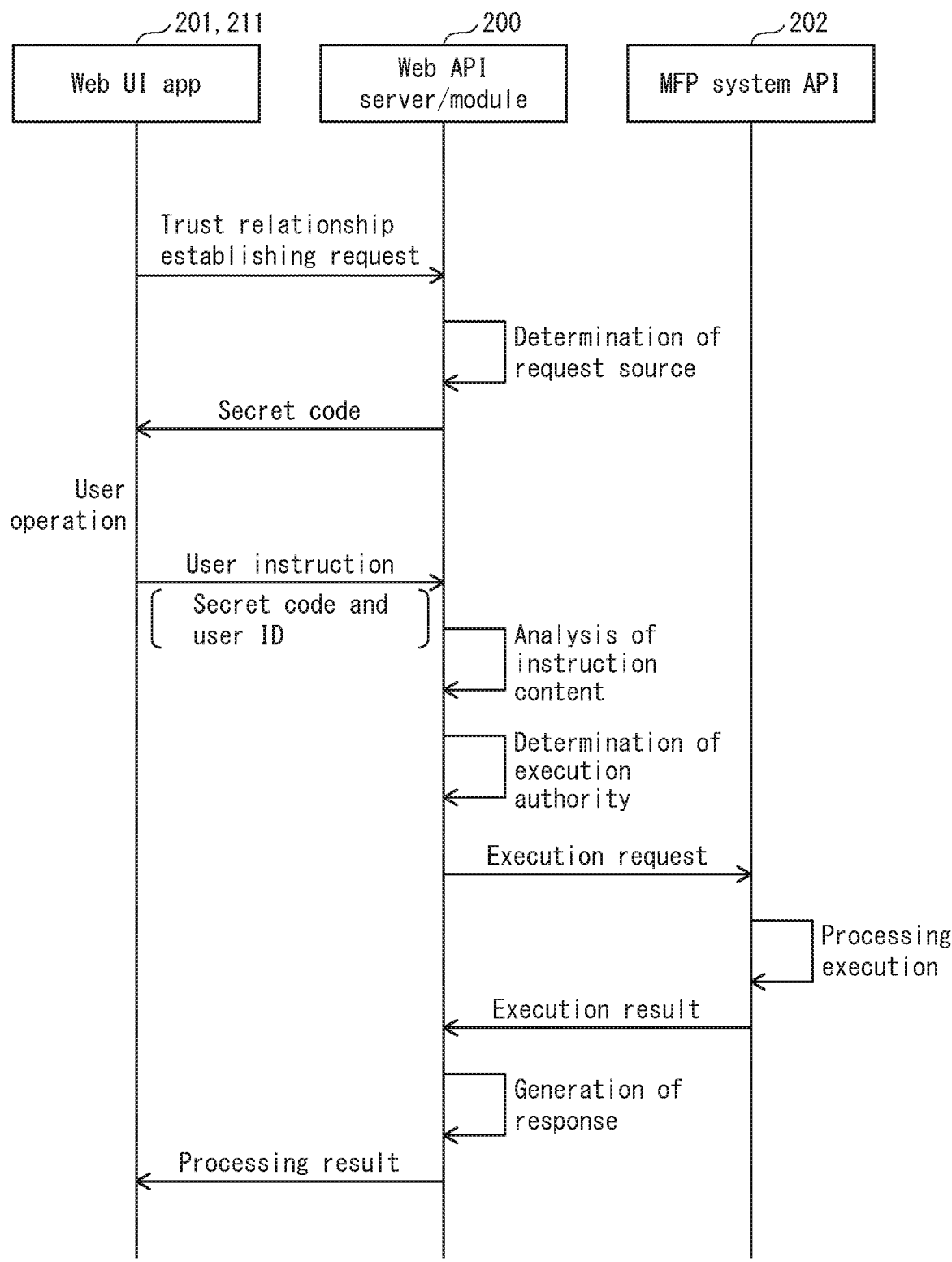
FIG. 3 is a sequence diagram illustrating main processing procedures of the image forming system pertaining to one or more embodiments of the present disclosure.

As illustrated in FIG. 3, the web UI 201, 211 transmits a trust relationship establishing request to the web API server 200 in advance of transmission of a user instruction to the MFP 100. For example, in the case of the web UI 201, when booting the MFP 100, restoring the MFP 100 from a power-saving mode, or the like; in the case of the web UI 211, when starting display of an operation screen for the MFP 100, or the like. When transmitting a trust relationship establishing request, the web UI 201 of the MFP 100 uses a web API library for internal applications, and the web UI 211 of the mobile terminal device 110 uses a web API for external applications.

Upon receiving a trust relationship establishing request, the web API server 200 generates a random number having a predefined number of digits as a secret code (also referred to as "instruction source information"), and a request source ID for identifying the source of the trust relationship establishing request, and the secret code and the request source ID are registered to a request source information table. Along with the secret code and the request source ID, a trust level of the request source is registered to the request source information table. The web API server 200 determines that the web UI 201, 211 transmitting the trust relationship establishing request is incorporated in the MFP 100 when the web UI used the web API library for internal UIs to transmit the trust relationship establishing request, and determines that the web UI transmitting the trust relationship establishing request is incorporated in an external device when the web UI used the web API library for external UIs to transmit the trust relationship establishing request.

The web UI 201, which uses the web API for internal UIs, is used only by users in the office 104, in which the MFP 100 is placed, and not by a large number of unspecified users. Accordingly, the web API server 200 determines that the web UI 201 has a high trust level and registers a high trust level in association with the web UI 201 in the request source information table. In contrast, the web UI 211, which uses the web API library for external UIs, is usable by a large number of unspecified users. Accordingly, the web API server 200 determines that the web UI 211 has a low trust level and registers a low trust level in association with the web UI 211 in the request source information table.

In the example in FIG. 4A, a request source whose request source ID is "App_001" is associated with "XXXXXXXX" as the secret code and a low trust level. In contrast, a request source whose request source ID is "App_003" is associated with "ZZZZZZZZ" as the secret code and a high trust level.

Among the APIs provided by the web API server 200, if the internal APIs in the MFP 100 are not publicly disclosed, unauthorized access in which the web UI 211 obtains a higher trust level by using the web API library for internal UIs to spoof as the web UI 201 can be prevented. After determination of whether the web UI transmitting the trust relationship establishing request is incorporated in the MFP 100 or an external device, the web API server 200 transmits the secret code to the web UI 201, 211 that is the request source. This completes the trust relationship establishing procedure.

The web UI 201, 211 notifies the web API server 200 of the secret code each time a user instruction is transmitted. The API used when transmitting a user instruction is the same regardless of whether the web UI transmitting the user instruction is inside or outside the MFP 100, and therefore the web API server 200 determines whether the trust level of the source of the user instruction is high or low by referring to the secret code included in the user instruction.

As described above, a secret code is generated each time a trust relationship establishing request is transmitted, and therefore the web UI 211 can be prevented from using a fake secret code to spoof as the internal web UI 201. Thus, reliability in determining the trust level of the web UI 201, 211 is high even where the same web API is used by both the web UI 201 and the web UI 211.

Thus, there is no need to duplicate the web API internally and externally to perform the same user instruction, and consequently an increase in development scale of the web API server 200 for prevention of external unauthorized access can be suppressed, and an increase in memory storage used by the web API server 200 can be suppressed.

After receiving the secret code from the web API server 200, upon receiving a user operation as input, the web UI 201, 211 transmits a user instruction to the web API server 200. The user instruction includes a user ID of the user of the web UI 201, 211 and the secret code sent back in response to the trust relationship establishing request.

For the user ID of the user of the web UI 201, a user ID received when the user logs in to the MFP 100 may be used; alternatively, a user ID may be input independently through the operation panel of the MFP 100. For the user ID of the user of the web UI 211, a user ID received when the user logs in to the mobile terminal device 110 may be used; alternatively, a user ID may be input independently through the operation panel of the MFP 100. Alternatively, a user ID registered in advance on the mobile terminal device 110 may be used.

Upon receiving the user instruction, the web API server 200 analyzes the content of the user instruction and extracts the processing requested and the user ID and the secret code included in the user instruction. The web API server 200 specifies an execution authority level (also referred to as "user level") associated with the user ID by referring to a user information table. As illustrated in FIG. 4B, the user information table is a table for storing execution authority levels in one-to-one correspondence with user IDs.

The web API server 200 specifies a trust level associated with the secret code by referring to the request source information table. When the trust level is "high", the web API server 200 refers to a first table to specify an execution authority level (also referred to as "required permission") required for executing the processing requested by the user instruction. In the example illustrated in FIG. 4C, the required permission for executing "prioritized sheet feed tray setting" is "general" in the first table. This means that a user whose user ID is associated with the execution authority of "general" and a whose user ID is associated with the execution authority of "administrator" are allowed to cause "prioritized sheet feed tray setting" to be executed. In contrast, the required permission for "network setting" is "administrator" in the first table. This means that a user whose user ID is associated with the execution authority of "administrator" but not a user whose user ID is associated with the execution authority of "general" is allowed to cause "network setting" to be executed.

The web API server 200 compares the required permission for execution of the processing requested by the user instruction and the execution authority of the user ID associated with the user instruction, and requests execution of the processing to the MFP system API 202 when the execution authority is equal to or higher than the required permission.

The MFP system API 202 executes the processing and sends back a result of executing the processing to the web API server 200. Then, the web API server 200 generates a response to the user instruction from the web UI 201, 211 in accordance with the execution result and sends back the response as a processing result.

[4] Structure of MFP 100

The following describes structure of the MFP 100.

Figure 5:
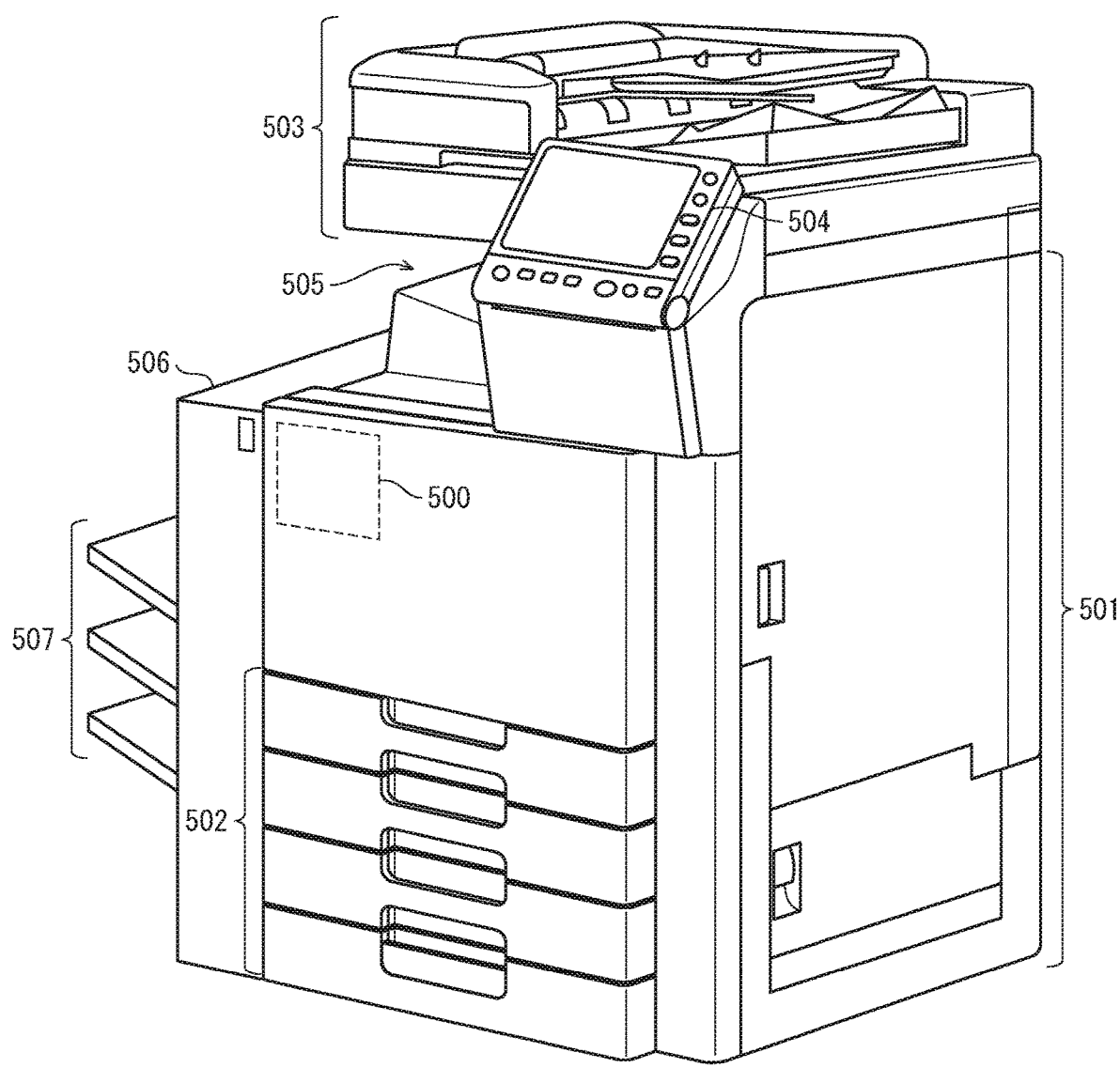
FIG. 5 is an external perspective diagram illustrating an overall structure of an MFP 100 according to one or more embodiments.

As illustrated in FIG. 5, the MFP 100 includes components such as an image former 501, a sheet feeder 502, an image reader 503, an operation panel 504, a post-processor 506, and the like, and executes processing such as image forming, copying, transmitting and receiving facsimile, and the like. The image former 501 includes an imaging unit and a fixer (not illustrated) and a controller 500, and the controller 500 is connected to the LAN 101 and a facsimile line (not illustrated).

The operation panel 504 includes physical buttons, a speaker, and a touch panel including a liquid crystal display (LCD) and a touch pad. The operation panel 504 displays information to users of the MFP 100, receives input from users through the touch panel or the physical buttons, warns users by emitting an alert sound, and the like.

When the user of the MFP 100 instructs the MFP 100 to execute an image forming operation by operating the operation panel 504, or when the controller 500 receives a print job from the PC 103 through the LAN 101 or from the mobile terminal device 110 through the Internet 120, the image former 501 causes the imaging unit to form a monochrome or color toner image.

When the sheet feeder 502 feeds a recording sheet in parallel with forming of the toner image, the image former 501 transfers the toner image onto the recording sheet and causes the fixer to heat-fix the toner image to the recording sheet. When executing duplex printing, the recording sheet is conveyed to a sheet refeed path to be reversed, and another toner image is transferred and heat-fixed onto a rear surface of the recording sheet. When post-processing is not executed, the recording sheet to which the toner image has been heat-fixed is ejected to a sheet eject tray 505 in a space in the main body of the MFP 100.

When post-processing is executed, the image former 501 ejects the recording sheet to the post-processor 506. The post-processor 506 executes post-processing such as folding, hole-punching, binding, cutting, inserting, stapling, stacking, and the like with respect to the recording sheet and ejects the post-processed recording sheet to an ejection tray unit 507 that protrudes from a side surface of the post-processor 506. The ejection tray unit 507 includes a plurality of trays.

When executing reading of a document, copying, facsimile transmission, and the like, the image reader 503 reads a color or monochrome document to generate image data. The image reader 503 may read a document placed on platen glass in accordance with a platen-set system; alternatively, the image reader 503 may read a surface or two surfaces of the document while conveying the document by an auto document feeder (ADF) in accordance with a sheet-through system.

When copying, the image former 501 forms an image with use of the read image data. When executing facsimile transmission, the read image data is transmitted by facsimile at a resolution negotiated with a facsimile device that is the transmission destination. Further, the controller 500 can receive facsimile data through the facsimile line.

Note that the sheet feeder 502 has a plurality of sheet feed trays, and feeds the recording sheet from a user-specified sheet feed tray or a sheet feed tray prioritized for use where a user does not specify the sheet feed tray to use.

[5] Structure and Operations of Controller 500

The following describes structure and operations of the controller 500.

Figure 6:
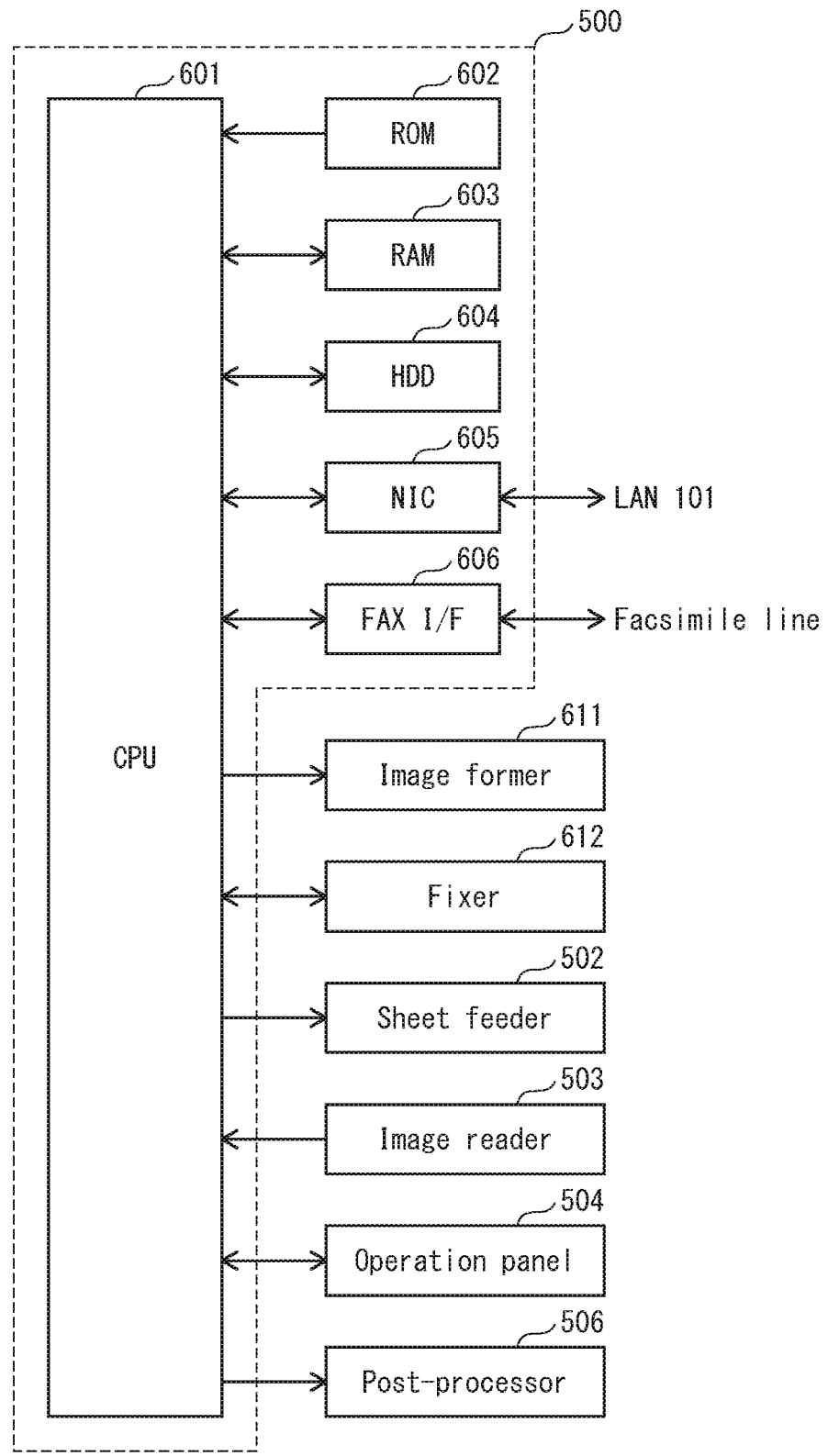
FIG. 6 is a block diagram illustrating main components of a controller 500 according to one or more embodiments.

As illustrated in FIG. 6, the controller 500 includes components such as a central processing unit (CPU) 601, a read-only memory (ROM) 602, a random-access memory (RAM) 603, and the like. When the MFP 100 is booted, the CPU 601 reads out a boot program from the ROM 602 and launches the boot program while using the RAM 603 as a working memory area. Then, the CPU 601 reads out the OS, a control program of the MFP 100, and application programs such as the web API server 200 from a hard disk drive (HDD) 604 and executes the read programs.

A network interface card (NIC) 605 executes communication processing in order for the CPU 601 to access the PC 103 and the mobile terminal device 110 through the LAN 101. A facsimile interface 606 transmits and receives facsimile data through the facsimile line.

When executing image forming, the CPU 601 controls the image former 611 to form a monochrome or color toner image and controls temperature of the fixer 612 to heat-fix the toner image to a recording sheet. Further, the CPU 601 controls the sheet feeder 502 to feed the recording sheet specified by the user.

As described above, the CPU 601 executes the web API server 200 to display information on the operation panel 504 and to receive input of user instructions. Further, the CPU 601 controls the post processor 506 to execute post-processing such as folding, hole-punching, binding, cutting, inserting, stapling, stacking, and the like with respect to the recording sheet, and ejects the post-processed recording sheet to the ejection tray unit 507.

Figure 7:
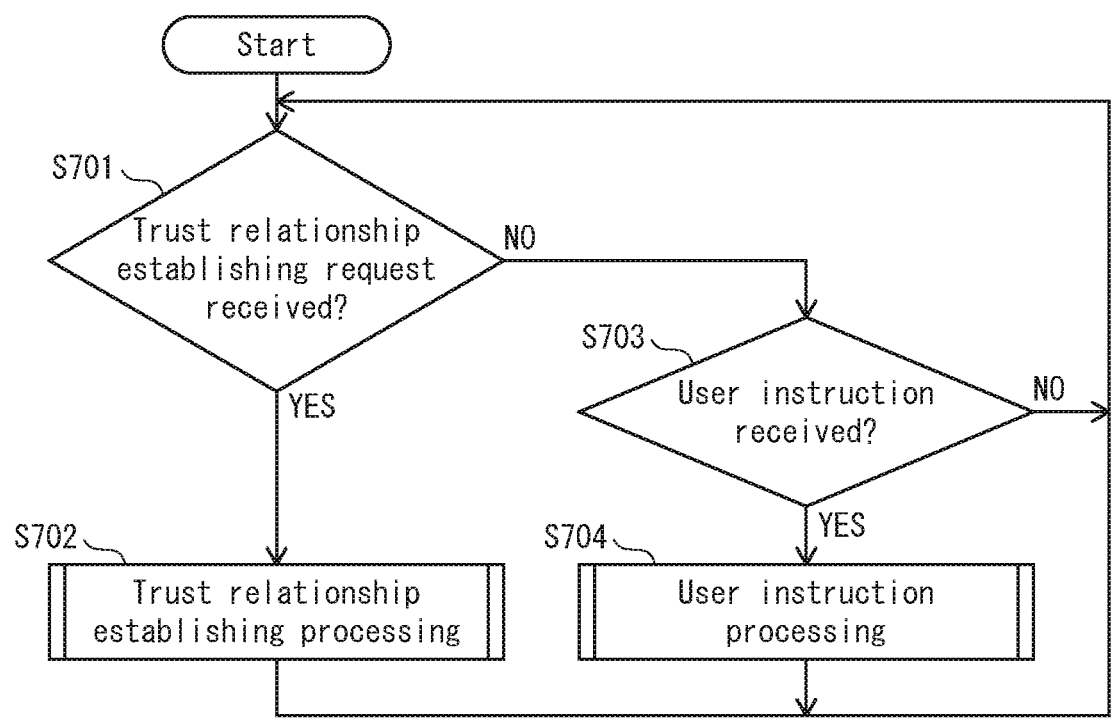
FIG. 7 is a flowchart illustrating main processing of the controller 500 according to one or more embodiments.

As illustrated in FIG. 7, upon receiving a trust relationship establishing request (S701: YES), the controller 500 executes trust relationship establishing processing (S702). Further, upon receiving a user instruction (S703: YES), the controller 500 executes processing (user instruction processing) in accordance with the user instruction (S704). After step S702 and step S704 and when no user instruction is received in step S703 (S703: NO), the controller 500 advances to step S701 to repeat the above processing.

Figure 8:
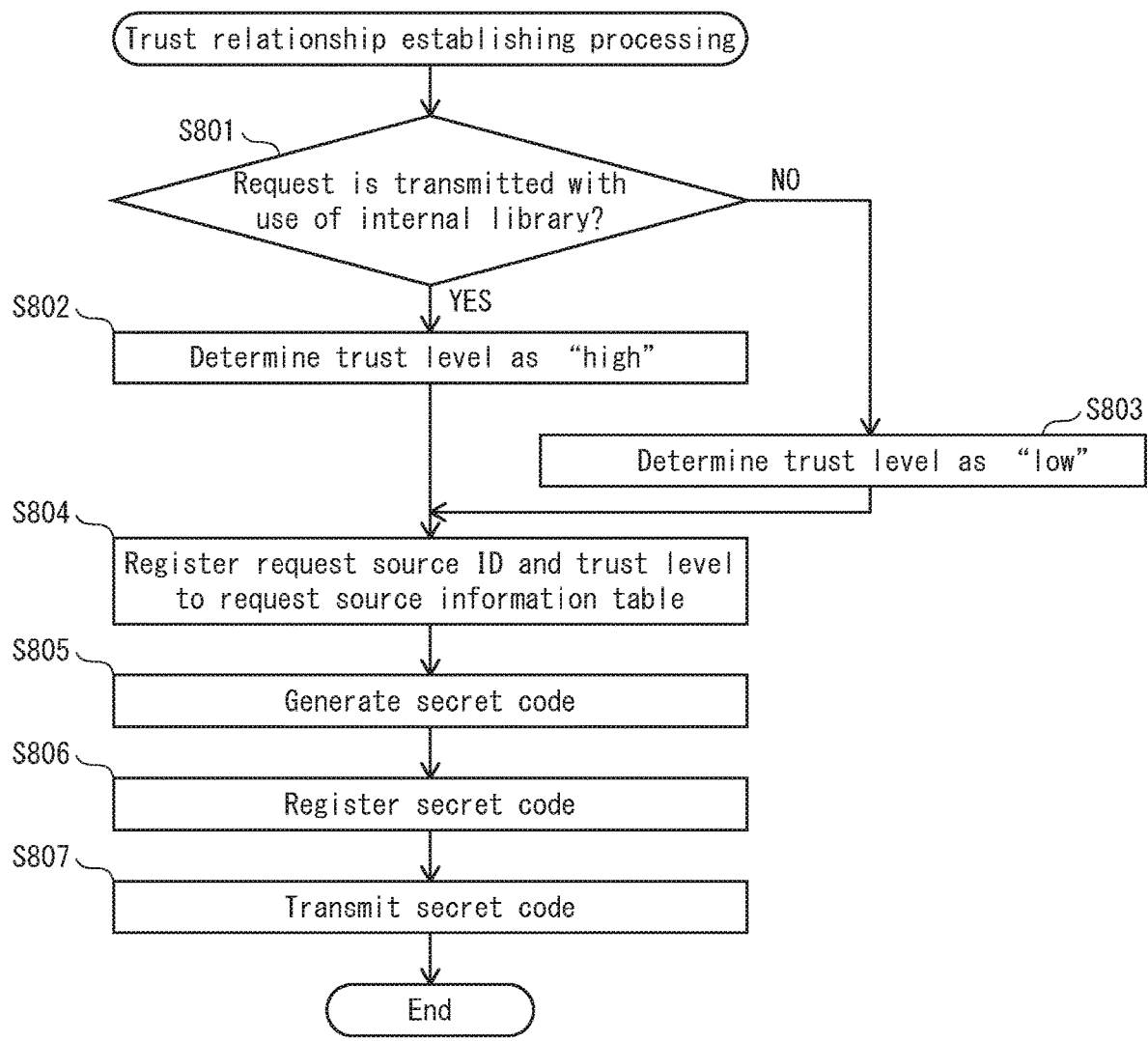
FIG. 8 is a flowchart illustrating trust relationship establishing processing by the controller 500 according to one or more embodiments.

As illustrated in FIG. 8, in the trust relationship establishing processing (S702), when the web API library used for the trust relationship establishing request is a library for internal UIs (S801: YES), determination is made that the web UI that is the source of the trust relationship establishing request has a high trust level (S802). In contrast, when the web API library used for the trust relationship establishing request is a library for external UIs (S801: NO), determination is made that the web UI that is the source of the trust relationship establishing request has a low trust level (S803).

Then, a request source ID is assigned to the request source, and the request source ID and the trust level associated with the request ID are registered to the request source information table (S804). Further, a random number having a predefined number of digits is generated (S805), and the random number is registered to the request source information table as a secret code in association with the request source ID assigned to the request source (S806). Then, the secret code is transmitted to the request source (S807), and the trust relationship establishing processing ends.

Figure 9:
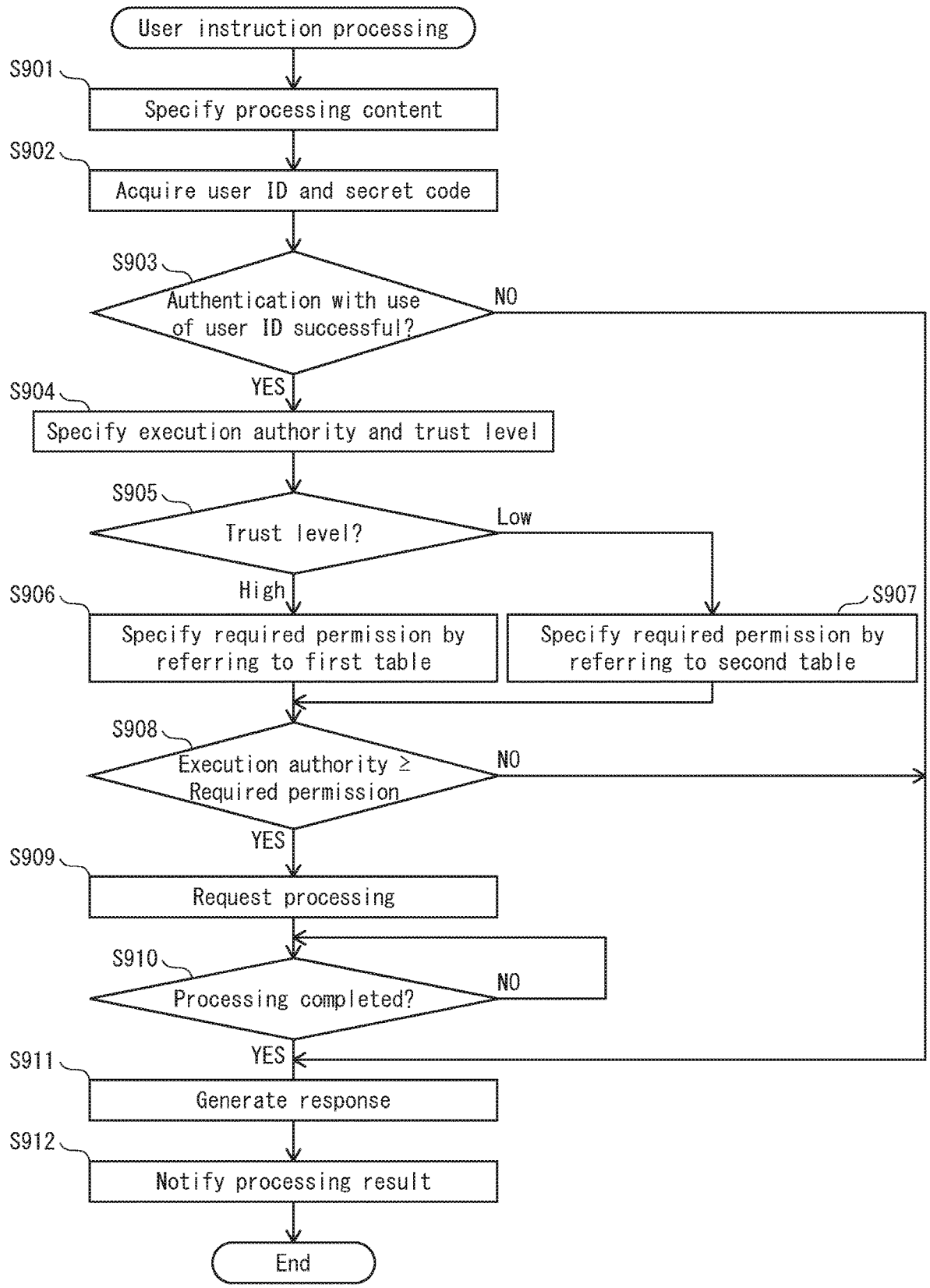
FIG. 9 is a flowchart illustrating user instruction processing by the controller 500 according to one or more embodiments.

As illustrated in FIG. 9, in user instruction processing (S704), upon receiving a user instruction from a web UI, the processing content of the user instruction is specified (S901), and the user ID and the secret code of the web UI are acquired (S902). Here, the secret code is the secret code that has been sent back in response to the trust relationship establishing request preceding the user instruction.

The web API server 200 requests authentication of whether or not the acquired user ID is an authorized user ID registered in advance through the MFP system API 202 to the authentication program 204. When the authentication is successful (S903: YES), the execution authority associated with the user ID is specified by referring to the user information table. Note that a password to use in the authentication processing may be acquired from the web UI in addition to the user ID.

Further, the trust level associated with the secret code is specified by referring to the request source information table (S904), and when the trust level is "high" (S905: "high"), the required permission associated with the processing content is specified by referring to the first table (S906). For example, as illustrated in FIG. 4C, the required permission "general" is assigned to the processing content "prioritized sheet feed tray setting" in the first table. In contrast, the required permission "administrator" is assigned to the processing content "network setting" in the first table.

When the trust level associated with the secret code is "low" (S905: "low"), the required permission associated with the processing content is specified by referring to the second table (S907). For example, as illustrated in FIG. 4C, the required permission "administrator" is assigned to both the processing content "prioritized sheet feed tray setting" and the processing content "network setting" in the second table.

Then, the execution authority associated with the user ID is compared with the required permission associated with the combination of the secret code and the processing content, and when the execution authority is equal to or higher than the required permission (S908: YES), the MFP system API 202 is requested to execute the processing (S909). "The execution authority is equal to or higher than the required permission" means that the execution authority is "general" or "administrator" when the required permission is "general" and that the execution authority is "administrator" when the required permission is "administrator". When the required permission is "administrator" and the execution authority is "general", determination is made that the execution authority is not equal to or higher than the required permission.

Then, upon completion of the requested processing (S910: YES), a response to the web UI is generated from an execution result received from the MFP system API 202 (S911). When authentication with use of the user ID fails (S903: NO) or when the execution authority is not equal to or higher than the required permission (S908: NO), a response indicating failure of the requested processing is generated (S911). The response is transmitted to the web UI as a processing result (S912), and the processing ends.

[6] Structure and Operations of Mobile Terminal Device 110

The following describes structure and operations of the mobile terminal device 110.

Figure 10:
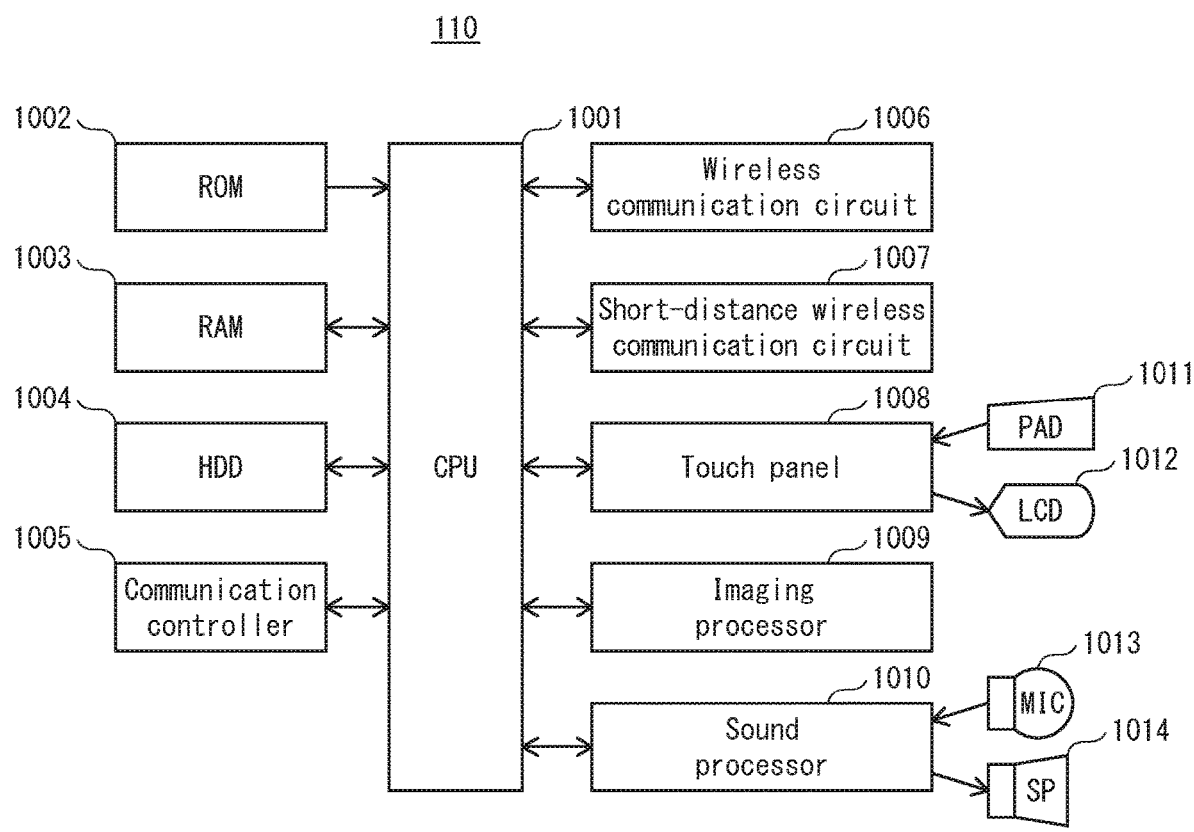
FIG. 10 is a block diagram illustrating main components of a mobile terminal device 110 according to one or more embodiments.

As illustrated in FIG. 10, the mobile terminal device 110 includes components such as a CPU 1001, a ROM 1002, a RAM 1003, and the like. When the mobile terminal device 110 is booted, the CPU 1001 reads out a boot program from the ROM 1002 and launches the boot program, and executes an OS and application programs such as the web UI 211 read from an HDD 1004 while using the RAM 1003 as a working memory area.

The CPU 1001 executes communication processing in accordance with the Internet Protocol (IP) with use of a communication controller 1005. A wireless communication circuit 1006 is a circuit for wireless communication with a wireless base station. A short-distance wireless communication circuit 1007 is a circuit for wireless communication with the wireless LAN master unit 121. The web UI 211 can access the MFP 100 with use of the IP through the Internet 120 with use of the short-distance wireless communication circuit 1007.

A touch panel 1008 includes a touch pad 1011 and a liquid crystal display 1012, and executes operations such as receiving touch input from a user of the mobile terminal device 110 and providing the user with information through text messages and images. An imaging processor 1009 includes a camera, and images still and moving images. A sound processor 1010 includes a microphone 1013 and a speaker 1014 and executes input and output of sounds in voice calls, output of sounds in playback of moving images and sounds, and the like.

Figure 11:
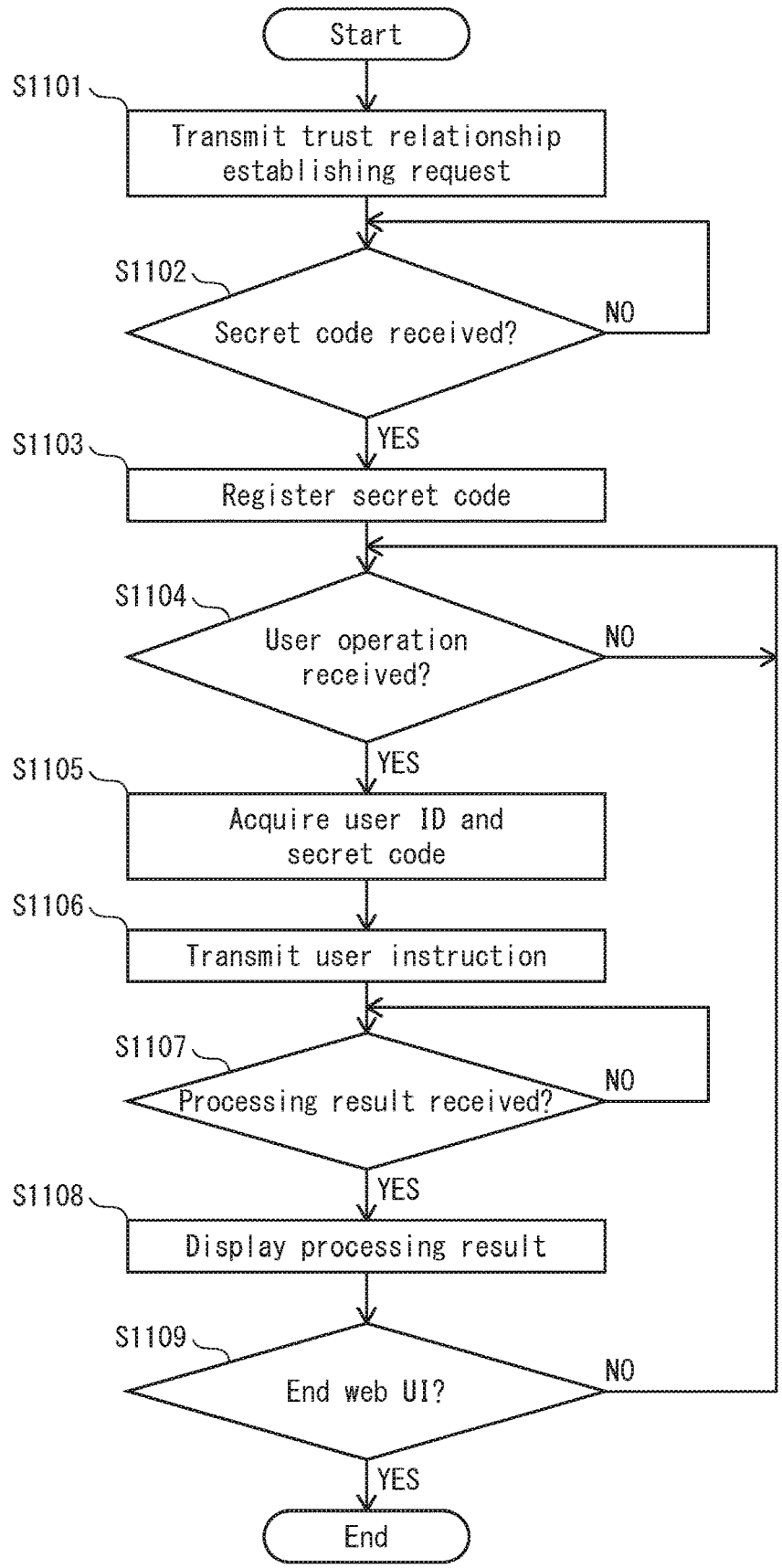
FIG. 11 is a flowchart illustrating processing of the mobile terminal device 110 according to one or more embodiments.

As illustrated in FIG. 11, when the web UI 211 is booted, the mobile terminal device 110 first transmits a trust relationship establishing request to the web API server 200 of the MFP 100 through the Internet 120 with use of the web API library for external UIs (S1101). Upon receiving a secret code from the web API server 200 through the Internet 120 in response to the trust relationship establishing request (S1102: YES), the received secret code is stored to the RAM 1003 or the HDD 1004 (S1103), and the mobile terminal device 110 waits for a user operation.

When a user operation is received via the web UI 211 displayed on the touch panel 1008 (S1104: YES), the user ID and the secret code are read out and acquired from the RAM 1003 or the HDD 1004 (S1105), and the acquired user ID and secret code are transmitted to the web API server 200 along with the processing content as a user instruction (S1106).

Upon receiving a processing result from the web API server 200 (S1107: YES), the mobile terminal device 110 causes the web UI 211 to display the processing result (S1108). When an instruction to end the web UI 211 is not received from the user (S1109: NO), the processing advances to step S1104 to repeat the above processing. When an instruction to end the web UI 211 is received (S1109: YES), the processing ends.

Some of the functions of the MFP 100 are restricted in accordance with the execution authority of the user. For example, changing of settings of the main body of the MFP 100 affects use by other users, and therefore is only possible by an administrator of the MFP 100. According to the above configuration, similar to execution of each function by remote operation using the web API, whether or not the user has the authority to cause a function to be executed is determined according to the API that requests execution of the function, and execution of the function is allowed when it is determined that the user has the authority to cause the function to be executed. This helps reduce security risks that may arise when allowing remote operation and helps prevent unexpected accidents that users may experience due to changes in settings of the main body of the MFP 100.

[7] Supplement to Required Permission Table

As exemplified in FIG. 4C, the required permission table includes a column for processing contents, a column for the first table, and a column for the second table. In the first and the second tables, to each of the processing contents, "general" or "administrator" is assigned as the permission required for a user to cause the processing content to be executed. When the required permission is "general", both users whose execution authority is "general" and users whose execution authority is "administrator" are allowed to cause the operation to be executed. In contrast, when the required permission is "administrator", only the users whose execution authority is "administrator" and not the users whose execution authority is "general" are allowed to cause the operation to be executed.

Operations in the column of the processing content are related to settings of the main body of the MFP 100. "Prioritized sheet feed tray setting" sets the sheet feed tray that feeds a recording sheet when the user does not specify the sheet feed tray that feeds a recording sheet when the MFP 100 executes image forming such as printing, copying, or receiving facsimile. Accordingly, if an unspecified person sets the prioritized sheet feed tray by an operation from outside the MFP 100, image forming may be executed with use of recording sheets of unexpected size and/or sheet type.

"Auto color level setting" sets a reference value for determining whether the document is a color document or a monochrome document when the image reader 503 reads a document. Accordingly, if an unspecified person sets the auto color level by an operation from outside the MFP 100, a monochrome image may be generated contrary to the user's intention upon reading of a color document.

"Output image direction setting" sets the direction of an output image used when the user does not specify a direction of the output image.

"Job execution setting with inappropriate setting" sets whether or not a job is forcibly executed even if an image reading condition, an image forming condition, or post-processing content is set inappropriately for the job, e.g. when the combination of the document size and the sheet size is a combination with which automatic magnification selection cannot be used.

"Power-saving setting" sets whether or not switching to the power-saving state is enabled and, when switching is enabled, a time period until switching to the power-saving state. A certain time period is required for restoration from the power-saving state to the printing state, and therefore unexpected changes in the power-saving setting may decrease convenience for users.

Among the processing contents above, "prioritized sheet feed tray setting", "auto color level setting", and "output image direction setting" relate to image quality and finishing of output objects, and therefore have a relatively small effect on other users.

Further, "job execution setting with inappropriate setting" and "power-saving setting" are settings of the main body of the MFP 100, and in the sense that changes in these processing contents would affect use of the MFP 100 by users other than the user who has changed the setting, only the users whose execution authority is "administrator" should be allowed to cause these settings to be executed. However, these settings are frequently changed in accordance with situations by the users who routinely use the MFP 100, and therefore it may be inconvenient for the users to ask the administrators to change these settings each time such a change is necessary.

Accordingly, in the first table, "prioritized sheet feed tray setting", "auto color level setting", "output image direction setting", "job execution setting with inappropriate setting", and "power-saving setting" are associated with the required permission of "general" to allow not only the users whose execution authority is "administrator" but also the users whose execution authority is "general" to cause these processing contents to be executed.

This configuration improves convenience for the users who are in the office 104 and directly operate the operation panel 504 of the MFP 100, given that such users have a higher trust level than the users performing remote operations with use of the web UI.

"Network setting" sets network connections, allowance and prohibition of access to external devices, and transmission destination servers for the main body of the MFP 100.

"Main body authentication setting" sets whether or not user authentication is required in advance of a user starting to use the MFP 100 and, in cases in which the user authentication is executed, the users to whom usage of the MFP 100 is allowed.

"Network setting" and "main body authentication setting" relate to security of the MFP 100 and whether or not functions of the MFP 100 operate normally. Accordingly, even among users who directly operate the operation panel 504 of the MFP 100, it is safer not to allow users whose execution authority is "general" to make changes to such settings, and to only allow users whose execution authority is "administrator" to make changes to such settings. Thus, for such settings, the required permission "administrator" is assigned in the first table so that only users whose execution authority is "administrator" are allowed to make changes.

On the other hand, regarding users who perform remote operations of the MFP 100 with use of the web UI, allowing unspecified users to change the settings freely could be a serious security risk. Accordingly, it is safer to not allow the settings to be changed unless the user who performs remote operations of the MFP 100 with use of the web UI is associated with the execution authority of "administrator". Accordingly, for all of "prioritized sheet feed tray setting", "auto color level setting", "output image direction setting", "job execution setting with inappropriate setting", "power-saving setting", "network setting", and "main body authentication setting", the required permission "administrator" is assigned in the second table so that these settings can only be changed by the users whose execution authority is "administrator".

The required permission tables are stored in advance in the controller 500 (HDD 604) of the MFP 100, and when functions of the MFP 100 are added and/or changed due to updating or the like, the required permission tables are changed accordingly.

[8] Modifications

Although the present disclosure has been described by way of one or more embodiments, it is to be noted that the present disclosure should not be construed as being limited to the above embodiments, and the following modifications may be implemented.

(8-1) Description is provided above of one or more embodiments in which the trust level is set by determining which of the web UI 201 (which uses the web API library for internal UIs) and the web UI 211 (which uses the web API library for external UIs) is used. However, the present disclosure should not be construed as being limited to this, and the following configuration is possible.

For example, the administrator of the MFP 100 provides the web UIs 201, 211 with authentication information such as key codes in advance, and the web UIs 201, 211 transmit the authentication information to the web API server 200 along with the trust relationship establishing request. The web API server 200 may determine whether or not trust relationship is to be established and whether the trust level is high or low by, for example, collating the authentication information by the authentication program 204.

In such a configuration, the administrator of the MFP 100 can freely set whether the trust level is high or low for each of the web UIs. Accordingly, a high trust level can be assigned to the mobile terminal device 110 when trust is assured. This improves convenience for the users of the mobile terminal device 110.

Also, in a configuration in which the trust level is assigned in accordance with whether the web API library is for internal UIs or for external UIs, authentication information may be transmitted along with the trust relationship establishing request to determine validity of the source of the trust relationship establishing request, and setting of the trust level and generation of the secret code may be executed only when authentication with use of the authentication information is successful.

(8-2) Description is provided above of one or more embodiments in which user authentication is executed with use of the authentication app installed to the controller 500. However, the present disclosure should not be construed as being limited to this, and the following configuration is possible.

Figure 12:
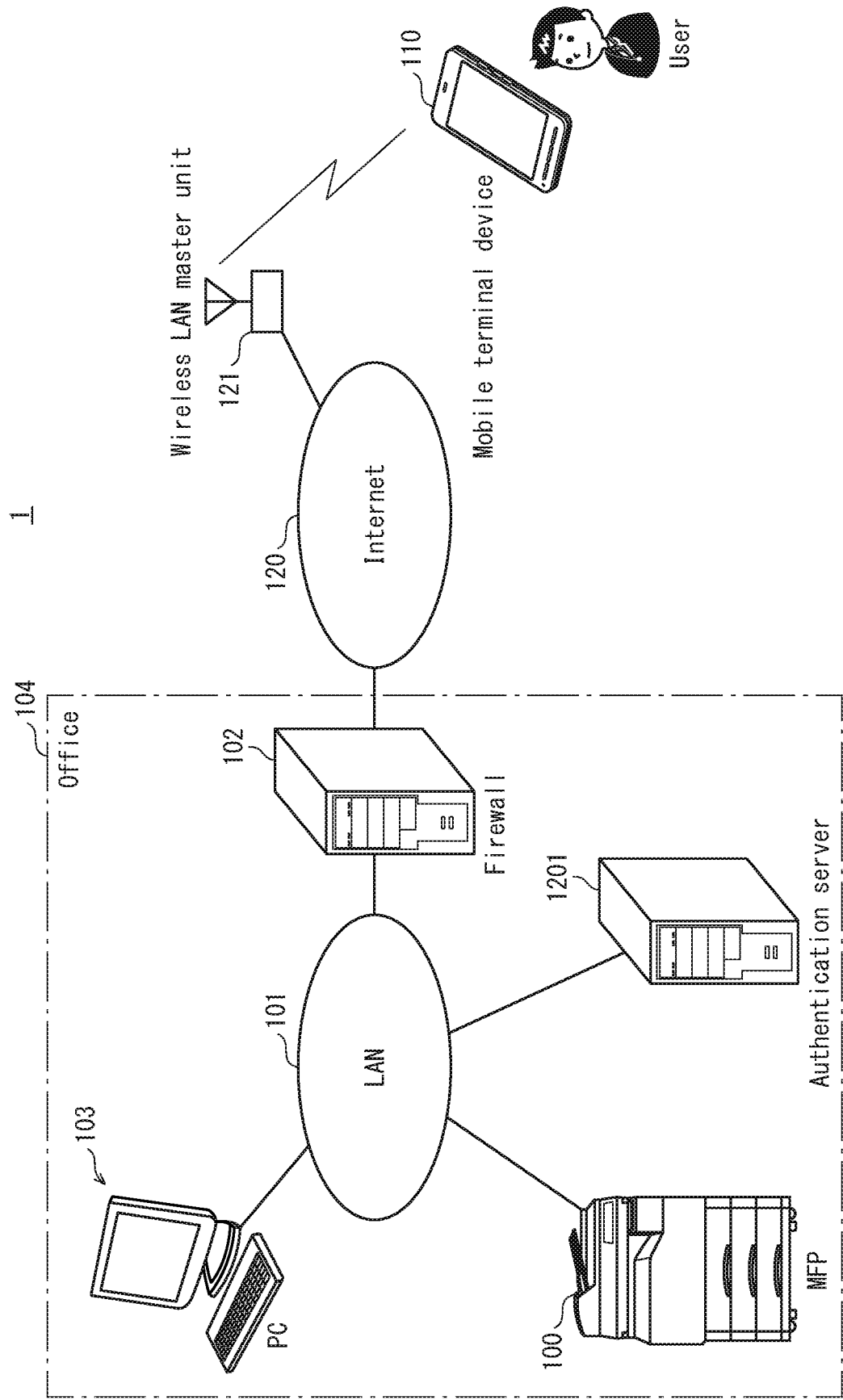
FIG. 12 illustrates main components of an image forming system pertaining to a modification of the present disclosure according to one or more embodiments.
Figure 13:
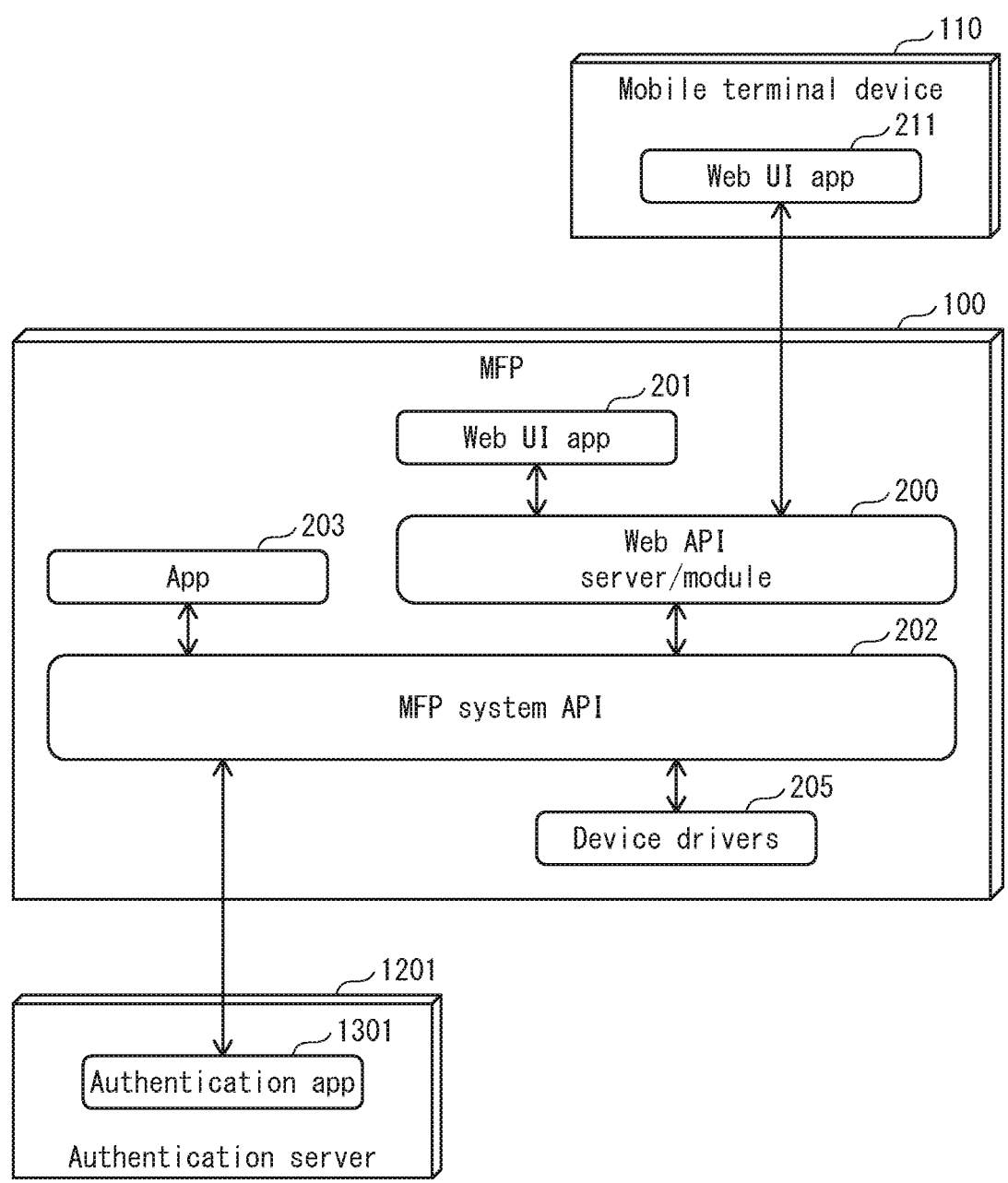
FIG. 13 illustrates main software components of the image forming system pertaining to a modification of the present disclosure according to one or more embodiments.

For example, as illustrated in FIG. 12, a configuration in which an authentication server 1201 is connected to the LAN 101 and the Internet 120 and the authentication server 1201 executes user authentication by transmitting authentication information with use of the MFP 100 to the authentication server 1201 is possible. In such a configuration, as illustrated in FIG. 13, an authentication app 1301 is installed to the authentication server 1201 and the web API server 200 executes authentication by transmitting a user ID through the MFP system API 202 to the authentication app 1301. Also in such a configuration, authentication may be executed with use of a password in addition to the user ID.

According to such a configuration, all authentication processing is executed collectively by the authentication server 1201 when a plurality of MFPs 100 are in the office 104 and/or the MFPs 100 are in a plurality of offices 104. Accordingly, authentication information of users is managed integrally with use of one or a small number of authentication servers 1201, and therefore a workload for management of the authentication information is reduced, and security risks of leakage, tampering, and the like of the authentication information is reduced.

(8-3) Description is provided above of one or more embodiments in which execution of the user instruction is not allowed when the user authentication fails irrespective of the source of the trust relationship establishing request, in order to decrease a workload for management of the mobile terminal device 110. However, the present disclosure should not be construed as being limited to this, and the following configuration is possible.

Figures 14A, 14B:
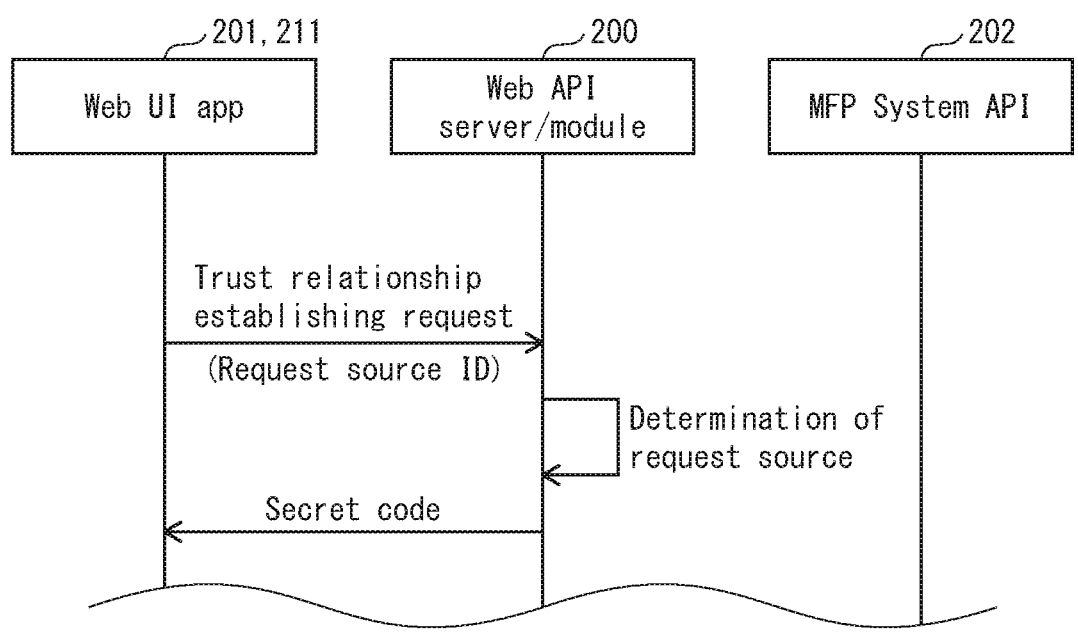
FIG. 14A illustrates a request source information table pertaining to a modification of the present disclosure according to one or more embodiments.
FIG. 14B is a sequence diagram illustrating trust relationship establishing procedure pertaining to a modification in FIG. 14A.

For example, as illustrated in FIG. 14A, the request source information table includes a column of default execution permissions (hereinafter referred to as "default permissions") and default permissions are assigned to the request source IDs in advance in one-to-one correspondence. In the example in FIG. 14A, the default permission is "general" for the request source ID of "App_001", and the default permission is "administrator" for the request source ID of "App_003".

As illustrated in FIG. 14B, when a web UI and the web API server 200 establish a trust relationship, the web API server 200 receives the request source ID of the web UI from the web UI. When the web UI uses the web API library for internal UIs, "high" is registered in association with the request source ID to the trust level column of the request source information table; when the web UI uses the web API for external UIs, "low" is registered in association with the request source ID to the trust level column of the request source information table.

When the web API server 200 receives a user instruction from the web UI and the user instruction does not include a user ID, the trust level column and the default permission column in the request source information table are referred to and the trust level and the default permission that correspond to the secret code included in the user instruction are acquired. Then, determination is made of whether or not the processing content is to be executed by comparing the default permission and the required permission that is associated with the combination in the required permission table of the processing content and the trust level corresponding to the user instruction.

According to this configuration, a user who is not registered in advance in the user information table can use the MFP 100 within the range of default permissions associated with the web API that has been used. This improves convenience for users and reduces an administrative workload to register users who wish to use the MFP 100 temporarily.

In such a configuration, the request source ID of the web UI may be transmitted to the web API server 200 along with the user instruction from the web UI, and the web API server 200 may refer to the request source information table to determine whether or not the secret code and the request source ID included in the user instruction are associated with each other in the request source table. Even when allowing users who are not registered in the user information table to use the MFP 100, it is beneficial to reduce security risks as much as possible by confirming validity of the user instructions.

(8-4) Description is provided above of one or more embodiments in which an execution authority for each user is acquired by referring to the user information table, but the present disclosure should not be construed as being limited to this. A user information server that is shared by a plurality of MFPs 100 and that stores in advance a user information table may be prepared, and when one of the plurality of MFPs 100 transmits a user ID to the user information server, the user information server may send back the execution authority associated with the user ID to the one of the MFPs 100 that transmitted the user ID. In such a configuration, the user information table is managed integrally, and therefore an administrative workload is reduced compared to cases in which each of the MFPs 100 is provided with a different user information table, and problems such as failure to update the user information table can be avoided.

(8-5) Description is provided above of one or more embodiments in which the MFP 100 includes components such as the image former 501, the sheet feeder 502, the image reader 503, the operation panel 504, the post-processor 506, and the like, and executes operations such as image forming, copying, transmitting and receiving facsimile, and the like. However, the present disclosure should not be construed as being limited to this. One or more of the above components need not be present, and one or more other components may be added.

Further, a configuration in which the image former 501 forms only monochrome images and a configuration in which the image reader 503 reads a document and a monochrome image is formed are possible. Further, the present disclosure achieves a similar effect when applied to, instead of the MFP 100, a single-function peripheral such as a printer device, a copier, a facsimile device, a scanner device, or the like.

[9] Review

An image forming device according to one or more embodiments is an image forming device that receives a user instruction from a web user interface (UI) application via a web application program interface (API). The image forming device includes a central processing unit (CPU) and a storage storing a first table that includes permission levels required for execution of user instructions that are received from an internal web UI application installed to the image forming device, and a second table that includes permission levels required for execution of user instructions that are received from an external web UI application installed to an external device. The CPU acquires a user level; determines whether a web UI application from which the user instruction is transmitted is installed to the image forming device or the external device; acquires a permission level required for execution of the user instruction, from the first table when the user instruction is received from the image forming device, and from the second table when the user instruction is received from the external device; and allows execution of the user instruction when the user level is equal to or higher than the permission level acquired. For each user instruction, the permission level included in the second table is equal to or higher than the permission level included in the first table.

According to one or more embodiments, the image forming device further includes an internal web API that, in advance of reception of the user instruction, receives a trust relationship establishing request from the internal web UI application and sends back instruction source information and an external web API that, in advance of reception of the user instruction, receives a trust relationship establishing request from the external web UI application and sends back instruction source information. The CPU receives instruction source information transmitted along with the user instruction, and determines that the web UI application is the internal web UI application when the instruction source information transmitted along with the user instruction matches the instruction source information sent back from the internal web API, and determines that the web UI application is the external web UI application when the instruction source information transmitted along with the user instruction matches the instruction source information sent back from the external web API.

According to one or more embodiments, the permission levels are defined in the first table so that execution of a user instruction related to settings of operations of the image forming device is allowed both to the user level defined as administrator authority and to the user level defined as general user authority, where the administrator authority is a higher user level than the general user authority.

According to one or more embodiments, the permission levels are defined in the second table so that execution of a user instruction related to settings of operations of the image forming device is allowed only to the user level defined as administrator authority.

According to one or more embodiments, the permission levels are defined, in the first table, so that execution of a user instruction related to settings of operations of the image forming device is allowed both to the user level defined as administrator authority and to the user level defined as general user authority, and, in the second table, only to the user level defined as administrator authority, where the administrator authority is a higher user level than the general user authority.

According to one or more embodiments, the settings of operations of the image forming device include a setting of changing an image forming output result.

According to one or more embodiments, the settings of operations of the image forming device include a setting of changing whether or not output of a formed image is allowed.

According to one or more embodiments, the settings of operations of the image forming device include a setting related to power-saving.

According to one or more embodiments, the storage further stores a user information table that includes user identification information and user levels in association with each other, and the CPU receives user identification information transmitted along with the user instruction, wherein the user level is acquired with the user identification information associated therewith.

According to one or more embodiments, the CPU receives user identification information transmitted along with the user instruction, and acquires the user level by transmitting the user identification information to a user level storing device and receiving the user level associated with the user identification information.

According to one or more embodiments, the storage further stores a default permission table that includes user levels for the internal web UI application and user levels for the external web UI application, and when the CPU fails to receive the user identification information, the CPU refers to the default permission table to acquire a user level associated with the web UI application from which the user instruction is transmitted.

According to one or more embodiments, the storage further stores a default permission table that includes user levels for the internal web UI application and user levels for the external web UI application, wherein when the CPU fails to receive the user identification information, the CPU refers to the default permission table to acquire the user level associated with the web UI application from which the user instruction is transmitted.

According to one or more embodiments, the first table and the second table are stored in the storage when manufacture of the image forming device is completed.

According to these configurations, required permissions are switched in accordance with whether the web UI is installed in the image forming device or in an external device. This reduces an administrative workload to set execution authority associated with the users and suppresses an increase in security risks arising due to allowing users to perform remote operations.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image forming device that receives a user instruction from a web user interface (UI) application via a web application program interface (API), the image forming device comprising:
　a central processing unit (CPU); and
　a storage connected to the CPU and that stores:
　　a first table that includes a permission level required for execution of user instructions that are received from an internal web UI application installed on the image forming device, and
　　a second table that includes a permission level required for execution of user instructions that are received from an external web UI application installed on an external device, wherein
　the CPU:
　　acquires a user level;
　　determines whether the web UI application from which the user instruction is transmitted is installed on the image forming device or the external device;
　　acquires a permission level required for execution of the user instruction:
　　　from the first table when the user instruction is received from the image forming device, and from the second table when the user instruction is received from the external device; and allows execution of the user instruction when the user level is equal to or higher than the acquired permission level, wherein for each user instruction, the permission level included in the second table is equal to or higher than the permission level included in the first table.

2. The image forming device of claim 1, further comprising:

an internal web API that, before receiving the user instruction:
- receives a first trust relationship establishing request from the internal web UI application, and
- transmits, to the internal web UI application in response to receiving the first trust relationship establishing request, first instruction source information;

an external web API that, in advance of the reception of the user instruction:
- receives a second trust relationship establishing request from the external web UI application, and
- transmits, to the external web UI application in response to receiving the second trust relationship establishing request, second instruction source information, wherein the CPU further:
- receives third instruction source information transmitted with the user instruction,
- determines that the web UI application is the internal web UI application when the third instruction source information matches the first instruction source information, and
- determines that the web UI application is the external web UI application when the third instruction source information matches the second instruction source information.

3. The image forming device of claim 1, wherein
the permission level in the first table is set so that execution of user instructions related to settings of operations of the image forming device is allowed for both a user level with administrator authority and a user level with general user authority, and
the administrator authority higher than the general user authority.

4. The image forming device of claim 1, wherein the permission level in the second table is set so that execution of user instructions related to settings of operations of the image forming device is allowed only for a user level with administrator authority.

5. The image forming device of claim 1, wherein
the permission level in the first table is set so that execution of user instructions related to settings of operations of the image forming device is allowed for both a user level with administrator authority and a user level with general user authority,
the permission level in the second table is set so that the execution of the user instructions related to the settings of operations of the image forming device is allowed only for the user level with the administrator authority, and
the administrator authority higher the general user authority.

6. The image forming device of claim 3, wherein the settings of operations of the image forming device include a setting of changing an image forming output result.

7. The image forming device of claim 4, wherein the settings of operations of the image forming device include a setting of changing an image forming output result.

8. The image forming device of claim 5, wherein the settings of operations of the image forming device include a setting of changing an image forming output result.

9. The image forming device of claim 3, wherein the settings of operations of the image forming device include a setting of changing whether output of a formed image is allowed.

10. The image forming device of claim 4, wherein the settings of operations of the image forming device include a setting of changing whether output of a formed image is allowed.

11. The image forming device of claim 5, wherein the settings of operations of the image forming device include a setting of changing whether output of a formed image is allowed.

12. The image forming device of claim 3, wherein the settings of operations of the image forming device include a setting related to power-saving.

13. The image forming device of claim 4, wherein the settings of operations of the image forming device include a setting related to power-saving.

14. The image forming device of claim 5, wherein the settings of operations of the image forming device include a setting related to power-saving.

15. The image forming device of claim 1, wherein
the storage further stores a user information table that includes user identification information associated with a respective user level,
the CPU further:
- receives the user identification information with the user instruction, and
- acquires the respective user level associated with the user identification information.

16. The image forming device of claim 1, wherein
the CPU receives user identification information with the user instruction, and
acquires the user level by transmitting the user identification information to a user level storing device and receiving a user level associated with the user identification information.

17. The image forming device of claim 15, wherein
the storage further stores a default permission table that includes user levels for the internal web UI application and user levels for the external web UI application, and
when the CPU fails to receive the user identification information, the CPU refers to the default permission table to acquire a user level associated with the web UI application from which the user instruction is transmitted.

18. The image forming device of claim 16, wherein
the storage further stores a default permission table that includes user levels for the internal web UI application and user levels for the external web UI application, wherein
when the CPU fails to receive the user identification information, the CPU refers to the default permission table to acquire a user level associated with the web UI application from which the user instruction is transmitted.

19. The image forming device of claim 1, wherein the first table and the second table are stored in the storage as a default setting of the image forming device.

* * * * *